United States Patent

[11] 3,571,741

[72] Inventor Jurge Leo Von Ruti
Villars-sur-Glane, Switzerland

[21] Appl. No. 772,193
[22] Filed Oct. 31, 1968
[45] Patented Mar. 23, 1971
[73] Assignee Vibro-Meter AG
Fribourg, Moncoe, Switzerland
[32] Priority Nov. 2, 1967
[33] Austria
[31] A9865/67

[54] ELECTRIC AMPLIFIER
5 Claims, 3 Drawing Figs.

[52] U.S. Cl. .... 330/51, 330/75, 330/109
[51] Int. Cl. .... H05f 1/14, H03f 3/52
[50] Field of Search .... 330/51, 75, 109, 103

[56] References Cited
UNITED STATES PATENTS

| | | | |
|---|---|---|---|
| 2,672,529 | 3/1954 | Villard, Jr. | 330/109X |
| 2,901,609 | 8/1959 | Campbell | 330/109X |
| 3,260,950 | 6/1966 | Saari | 330/103X |

*Primary Examiner*—Nathan Kaufman
*Attorney*—Watson, Cole, Grindle & Watson

ABSTRACT: Electric amplifier, particularly for piezoelectric transducers, having a feedback of a plurality of capacitances and resistances coupled in parallel with the capacitances, both the capacitances and the resistances being graduated each in a progression and selectively engageable by means of switches.

Inventor
Jürg Leo von Rüti
By
Watson, Cole, Grindle & Watson
Attys.

Inventor
Jürg Leo von Rüti
By
Watson, Cole, Grindle + Watson
Att'ys.

ELECTRIC AMPLIFIER

BACKGROUND OF THE INVENTION

The invention relates to an electric amplifier, particularly for the amplification of signals from piezoelectric transducers, comprising a feedback consisting of a plurality of capacitances and of resistances coupled in parallel with the capacitances, and two switches for the selective engagement of one capacitance and of one resistance.

Electric amplifier of this type, for example so-called electrometer amplifiers, are used in various measuring and monitoring circuits in conjunction with generally piezoelectric transducers for the purpose of converting electric charges into amplified voltage signals, the voltage prevailing at the output of the amplifier being a function of the charge existing at the input and of the capacitance of the feedback, so that the sensitivity of the amplifier is determined by the value of the capacitance. By the engagement of different capacitances the sensitivity of the system can be controlled and overdriving of the amplifier avoided. On the other hand, the time constant of the circuit is determined by the product of capacitance by resistance of the feedback. Consequently, any change in sensitivity entails a corresponding alteration of the time constant unless the resistance of the feedback is appropriately altered with every change of sensitivity.

Certain types of amplifier circuits have been devised wherein the resistances of the feedback are changed over by means of a special rotary switch in a similar manner as are the capacitances. However, this arrangement implies the need for a complicated readjustment of the time constant by appropriately altering the resistance value, so that it is difficult to properly adjust such an amplifier. Furthermore, it is generally impossible to use the same time constant over a number of sensitivity stages.

SUMMARY OF THE INVENTION

It is the object of the invention to provide an improved amplifier system wherein the time constant can be set independently from sensitivity, and will remain unchanged even when the sensitivity is altered.

The invention consists in an electric charge amplifier, particularly suitable for the amplification of the signals from piezoelectric transducers, comprising a feedback consisting of a plurality of capacitances and of a plurality of resistances coupled in parallel with the said capacitances, a switch for the selective engagement on one of the capacitances and another switch for the selective engagement of one of the resistances, detachable clutch means being provided for the purpose of coupling the two switches together, both the capacitances and the resistances in the same switching direction in which they are consecutively engageable, being graduated each in progression, the quotient of one progression equaling the reciprocal value of the quotient of the other progression. Preferably the capacitances and the resistances are graduated each in geometrical progression.

By coupling the actuating members of the two switches for the various capacitances and different resistances of the feedback, the feedback resistance is changed over simultaneously whenever there is a change of sensitivity, since the switch for the capacitances takes the switch for the resistances along. As a result of the graduation of the capacitances and the resistances at the aforesaid ratio, the resistance of the feedback is altered with each changeover of the capacitance to such an extent that the product of capacitance by resistance and consequently, the time constant of the amplifier remain unchanged. After releasing the coupling between the two switches the time constant can be set as required by appropriately displacing the switches in relation to each other, whereupon it will preserve its predetermined value irrespective of any change in sensitivity.

The two switches, for example contact discs are mounted on coaxial shafts, the said shafts being actuated by means of coaxial control buttons. The control button associated with the switch for the capacitances is preferably provided with marks representing values which indicate the time constant of the change amplifier and are readable through a window provided in the other control button associated with the resistances. The detachable clutch may consist of a click-stop device comprising at least one spring-loaded stop pin located in a bore of one control button and engaging in notches of the other control button. The relative displacement of the control buttons is effected in a simple manner by overcoming the spring action of the click stop device.

Since the time constant determines the frequency response of the circuit, not only the sensitivity but also the time constant should be variable with the largest number of steps possible. For that purpose, the switch for the resistances is so designed as to comprise at least twice as many switch positions with different values as does the capacitance-controlling switch. Each sensitivity value can be associated with a number of time-constant values which is at least double the number of sensitivity stages provided. As a result of this arrangement, the time constant may be maintained unchanged over the entire sensitivity range in at least the same number of stages as there are sensitivity stages provided.

BRIEF DESCRIPTION OF THE DRAWING

Further optional details of the invention will appear from the following description of an embodiment of the invention with reference to the accompanying drawings in which.

DESCRIPTION OF THE PREFERRED EMBODIMENT

Figure 1:
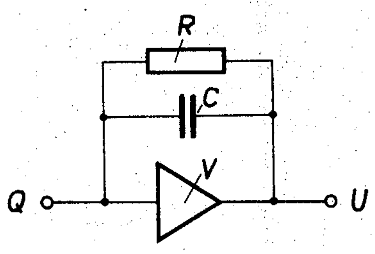
FIG. 1 shows the schematic circuit diagram of a amplifier according to the invention.

The circuit illustrated in FIG. 1 comprises an amplifier V with a feedback capacitance $C$ and a resistance $R$ in parallel with the latter. The input of the amplifier V is designated by reference character $Q$ and the output by $U$. The charge delivered at the input $Q$ is converted into a voltage at the output $U$, the output voltage being a function of the charge at the input and of the coupling capacitance $C$. If the amplification constant of the amplifier is assumed to be very high, for example 1,000, the output voltage can be computed approximately according to the formula $$U=\frac{Q}{C}$$

It follows that the sensitivity of the circuit is a function of the magnitude of the capacitance $C$. On the other hand, the magnitude of the resistance R determines the time of discharge of the capacitance $C$ and consequently the period of time required for the evacuation of the charge from the input of the amplifier. Therefore, the time of discharge is a function of the product of the capacitance $C$ by the resistance $R$ so that the frequency response characteristic of the circuit is determined by a time constant $$T=R\cdot C.$$

In order to be able to adapt the sensitivity and the time constant of the circuit to given requirements, it is necessary to alter the magnitude of the capacitance $C$ and of the resistance $R$. For that purpose, two switches being mounted on coaxial shafts 3 and 4 and actuated by control buttons 5 and 6, respectively. Each of the two switches 1 and 2 designed as contact discs for example, has a plurality of switch positions to be engaged consecutively by appropriately turning the control buttons 5, 6. Associated with switch 1 are for example, five capacitances $C_1$ to $C_5$, whereas switch 2 permits the engagement of ten different resistances $R_1$ to $R_10$. As appears from FIG. 2, the capacitances $C$ and the resistances $R$ are connected via lines with the contacts of the associated switches 1, 2 and connectable by means of these between the input and the output of the amplifier V.

Figure 3:
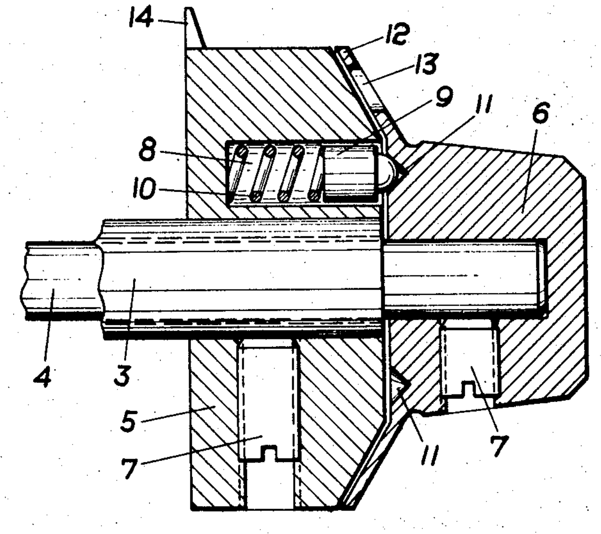
FIG. 3 shows a sectional view along line III–III of FIG. 2.

As shown in FIG. 3, the control buttons 5 and 6, nonrotatably mounted on the associated shafts 3, 4 respectively by means of a worm-screw 7, are interconnected by means of detachable clutch means comprising a click-stop device with a stop pin 9 displaceable in a bore 8 of the control button 5 and loaded by a spring 10 and engaging in notches 11 provided in the control button 6. Thus the two control buttons 5, 6 are in driving connection and are rotatable in relation to each other only following the displacement of the stop pin 9 against the action of the spring 10. The control button 6 is furthermore provided with a flangelike extension 12 in which a window 13 is recessed. On the periphery of the control button 5 a nose 14 is provided.

Figure 2:
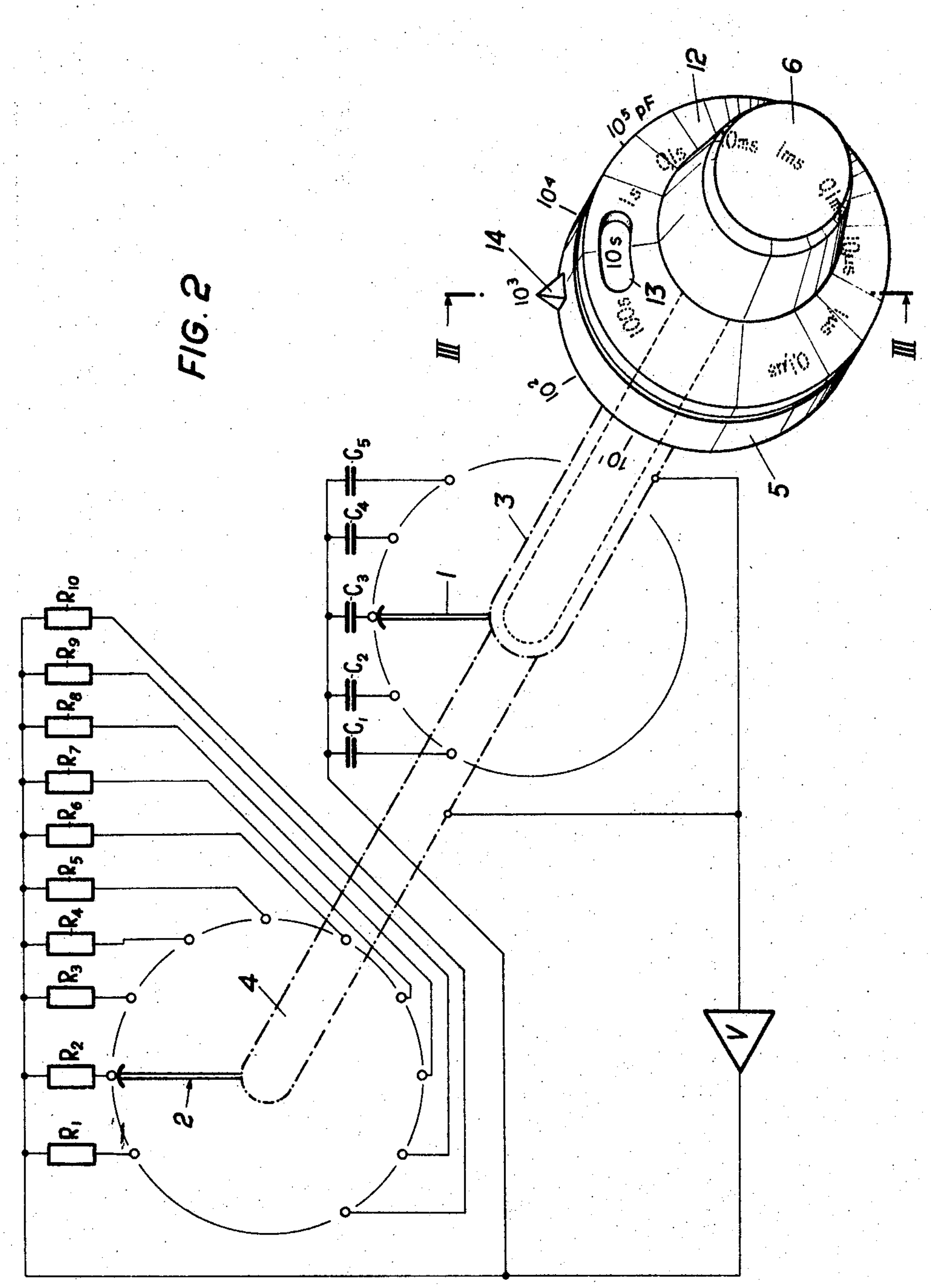
FIG. 2 shows a schematic perspective view of a detail of the amplifier.

As appears from FIG. 2, the capacitances $C_1$ and $C_5$ are engaged by means of the control button 5 via shaft 3 and switch 1, as a result of which the sensitivity of the amplifier circuit is set. This setting is readable on a scale mounted on the periphery of the control button 5 and indicating the capacitance valves in pf., the nose 14 pointing to the value set. The control button 6 serves for the setting of the resistance values and actuates the switch 2 via shaft 4. As a result of the driving connection between the two control buttons, the control button 6 is driven by the control button 5, the relative setting between the two control buttons which is readable through the window 13 on a scale mounted on the control button 5, remaining unchanged. This scale is provided with time unit marks indicating the time-constant of the amplifier.

When the sensitivity of the amplifier circuit is modified by a change of the capacitance of the feedback, the resistance of the feedback is thus also altered by means of the switch 2. The consecutive capacitances $C_1$ to $C_5$ arranged in the switching direction are now in tune with the resistances $R_1$ and $R_10$ consecutively arranged in the same switching direction in such a manner that when the two control buttons 5, 6 are jointly adjusted, the product of the capacitances by the resistances set at any given moment will always remain constant owing to the fact that the capacitances and the resistances are graduated each in such progression in the same switching direction, that the quotients of each pair of consecutive members of both progressions have reciprocal values, the time constant of the amplifier being exclusively a function of the relative position of the two control buttons 5 and 6 and remaining unchanged when the two control buttons are jointly adjusted. After the required time constant has been set, the sensitivity of the amplifier may be changed as required without thereby altering the time constant.

As appears furthermore from FIG. 2, five capacitances $C_1$ and $C_5$ and ten resistances $R_1$ and $R_10$ are provided in this embodiment of the invention. If the switching direction is assumed to be clockwise, the values of the capacitances form an ascending row, such as for example, a geometrical progression with the capacitances $10^1$, $10^2$ ... $10^5$ pf. and with the quotient 10, whereas in the same switching direction the valves of the resistances form a descending row, such as for example, a descending geometrical progression with the resistances $10^{1}1$, $10^{1}0$, ... $10^2\Omega$ and with the quotient $10^{11}$. Thus ten different resistances values can be associated with each of the five capacitance values, with the possibility of setting six resulting values of the time constant in such a manner as to remain constant over the entire sensitivity range for all sensitivity stages. Accordingly, all of adjustable sensitivity values of the amplifier may be associated with an equal number of values of the time constant remaining constant for all sensitivity values.

I claim:

1. An electric amplifier, particularly suitable for the amplification of signals from piezoelectric transducers provided with an input circuit and an output circuit, comprising a feedback circuit connected between said input and said output circuits and consisting of a plurality of capacitances and resistances, one capacitance being connected in parallel with one resistance, a first switch for the selective engagement of one of the capacitances, a second switch for the selective engagement of one of the resistances, said switches being incorporated in parallel into said feedback circuit, each switch having a series of selectively engageable contacts, one terminal of each of said capacitances and of said resistances being connected to one of said input and output circuits, the other terminal leading to a contact of one of said switches, and detachable clutch means to couple the two switches together, the values of both the capacitances and resistances being graduated in progression in the same switching direction in which they are consecutively engageable so that the quotient of any consecutive pair of one progression equals the reciprocal of the quotient of any consecutive pair of the other progression.

2. An electric charge amplifier as claimed in claim 1, further comprising two coaxial shafts, one of the shafts being connected with one switch and the other shaft with the other switch, two coaxial control buttons mounted on the extremities of the two shafts, and a scale for each control button for reading the values engaged in the various switch positions of the control buttons, the scale associated with the control button connected with the switch for the resistances being located on the control button connected with the switch for the capacitances and provided with marks indicating values representing the time constant of the charge amplifier.

3. An electric amplifier as claimed in claim 2, wherein a window is recessed in the control button connected by means of the associated shaft with the switch for the resistance values, the set time constant being readable through the said window on the scale located on the other control button.

4. An electric amplifier as claimed in claim 2, wherein the detachable clutch means comprises a click stop device having at least one spring-loaded stop pin located in a bore of one control button and engaging in notches provided in the other control button.

5. An electric amplifier as claimed in claim 1, wherein at least twice as many resistances are provided as there are capacitances, the switch engaging the resistances having at least twice as many switch positions as the switch engaging the capacitances.